United States Patent
Sutter et al.

(10) Patent No.: US 9,294,716 B2
(45) Date of Patent: Mar. 22, 2016

(54) METHOD AND SYSTEM FOR CONTROLLING AN IMAGING SYSTEM

(75) Inventors: Edward L. Sutter, Fanwood, NJ (US); Hock M. Ng, Westfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 966 days.

(21) Appl. No.: 13/479,504

(22) Filed: May 24, 2012

(65) Prior Publication Data

US 2013/0314543 A1 Nov. 28, 2013

(51) Int. Cl.
*H04N 7/14* (2006.01)
*G06F 3/01* (2006.01)

(52) U.S. Cl.
CPC ............... *H04N 7/144* (2013.01); *G06F 3/011* (2013.01)

(58) Field of Classification Search
CPC ... G03B 15/16; H04N 5/232; H04N 5/23203; H04N 7/141; H04N 7/14; H04N 7/142; H04N 7/15; H04N 5/23296; H04N 5/23293; G06F 3/01; G06F 3/011
USPC .................. 348/14.01–14.16, 211.1–211.14, 348/211.99, 208.1–208.16, 143, 159; 396/56
See application file for complete search history.

(56) References Cited

U.S. PATENT DOCUMENTS

| | | | |
|---|---|---|---|
| 3,871,113 A * | 3/1975 | Crago | .................... G09B 9/063 353/13 |
| 3,984,628 A * | 10/1976 | Sharp | ......................... 348/211.8 |
| 5,355,163 A | 10/1994 | Tomitaka | |
| 5,367,506 A | 11/1994 | Inanaga et al. | |
| 5,500,671 A | 3/1996 | Andersson et al. | |
| 5,526,037 A * | 6/1996 | Cortjens et al. | .............. 348/14.1 |
| 5,596,645 A | 1/1997 | Fujimori | |
| 5,745,161 A | 4/1998 | Ito | |
| 5,786,846 A | 7/1998 | Hiroaki | |
| 5,844,599 A | 12/1998 | Hildin | |
| 5,896,128 A | 4/1999 | Boyer | |
| 5,940,118 A | 8/1999 | Van Schyndel | |
| 5,963,250 A | 10/1999 | Parker et al. | |
| 6,005,610 A | 12/1999 | Pingali | |

(Continued)

FOREIGN PATENT DOCUMENTS

| | | | |
|---|---|---|---|
| EP | 1643769 A1 | 4/2006 |
| WO | 9306690 A1 | 4/1993 |

(Continued)

OTHER PUBLICATIONS

Swivl Web Page, downloaded May 7, 2012; www.swivl.com, 3 pages.

(Continued)

*Primary Examiner* — Sath V Perungavoor
*Assistant Examiner* — Nathnael Aynalem
(74) *Attorney, Agent, or Firm* — Chiesa Shahinian & Giantomasi PC

(57) ABSTRACT

First image data representing a first view, captured by a camera system, of a second location, is displayed at the first location. The first view is associated with a first orientation relative to the second location. A first angular displacement associated with a motion of a chair disposed at the first location is determined. Information representing the first angular displacement is transmitted to the camera system. Second image data representing a second view of the second location associated with a second orientation is displayed at the first location, the second orientation having a relationship to the first orientation based on the first angular displacement.

21 Claims, 12 Drawing Sheets

(56) References Cited

U.S. PATENT DOCUMENTS

| | | | |
|---|---|---|---|
| 6,021,206 A | 2/2000 | Mcgrath | |
| 6,072,522 A | 6/2000 | Ippolito et al. | |
| 6,122,005 A | 9/2000 | Sasaki et al. | |
| 6,137,485 A | 10/2000 | Kawai et al. | |
| 6,239,838 B1 | 5/2001 | Lee et al. | |
| 6,266,082 B1 | 7/2001 | Yonezawa et al. | |
| 6,275,258 B1 | 8/2001 | Chim | |
| 6,313,875 B1 | 11/2001 | Suga et al. | |
| 6,318,825 B1 | 11/2001 | Carau | |
| 6,385,352 B1 | 5/2002 | Roustaei | |
| 6,487,600 B1 | 11/2002 | Lynch | |
| 6,593,956 B1 | 7/2003 | Potts et al. | |
| 6,628,887 B1 | 9/2003 | Rhodes et al. | |
| 6,766,035 B1* | 7/2004 | Gutta | 382/103 |
| 6,772,195 B1 | 8/2004 | Hatlelid et al. | |
| 6,795,106 B1* | 9/2004 | Cooper | 348/14.08 |
| 7,035,418 B1 | 4/2006 | Okuno et al. | |
| 7,039,221 B1 | 5/2006 | Tumey et al. | |
| 7,111,045 B2 | 9/2006 | Kato et al. | |
| 7,202,889 B2 | 4/2007 | Suzuki et al. | |
| 7,221,386 B2 | 5/2007 | Thacher et al. | |
| 7,271,827 B2 | 9/2007 | Nister | |
| 7,283,788 B1 | 10/2007 | Posa et al. | |
| 7,330,607 B2 | 2/2008 | Jung et al. | |
| 7,512,883 B2 | 3/2009 | Wallick et al. | |
| 7,626,569 B2 | 12/2009 | Lanier | |
| 7,840,903 B1 | 11/2010 | Amidon et al. | |
| 7,880,739 B2 | 2/2011 | Long et al. | |
| 7,913,176 B1 | 3/2011 | Blattner et al. | |
| 7,987,309 B2 | 7/2011 | Rofougaran | |
| 7,995,090 B2 | 8/2011 | Liu et al. | |
| 8,111,282 B2 | 2/2012 | Cutler et al. | |
| 8,125,444 B2 | 2/2012 | Norager | |
| 8,150,063 B2 | 4/2012 | Chen et al. | |
| 8,156,184 B2 | 4/2012 | Kurata et al. | |
| 8,264,522 B2 | 9/2012 | Martin et al. | |
| 8,355,040 B2 | 1/2013 | Trachtenberg et al. | |
| 8,380,550 B2 | 2/2013 | Mattimore et al. | |
| 8,397,168 B2 | 3/2013 | Leacock et al. | |
| 8,411,128 B2 | 4/2013 | Kang et al. | |
| 8,411,165 B2 | 4/2013 | Ozawa | |
| 8,451,994 B2 | 5/2013 | Abuan et al. | |
| 8,547,416 B2 | 10/2013 | Ozawa | |
| 8,584,026 B2 | 11/2013 | Lynk et al. | |
| 2002/0039111 A1 | 4/2002 | Gips et al. | |
| 2002/0072993 A1 | 6/2002 | Sandus et al. | |
| 2002/0149672 A1 | 10/2002 | Clapp et al. | |
| 2002/0167486 A1* | 11/2002 | Tan et al. | 345/156 |
| 2003/0081115 A1 | 5/2003 | Curry et al. | |
| 2003/0206232 A1 | 11/2003 | Suzuki et al. | |
| 2004/0003409 A1 | 1/2004 | Berstis | |
| 2004/0189701 A1 | 9/2004 | Badt | |
| 2004/0233282 A1 | 11/2004 | Stavely et al. | |
| 2004/0257432 A1 | 12/2004 | Girish et al. | |
| 2005/0007445 A1 | 1/2005 | Foote et al. | |
| 2005/0062869 A1 | 3/2005 | Zimmermann et al. | |
| 2005/0280701 A1 | 12/2005 | Wardell | |
| 2005/0285950 A1 | 12/2005 | Oya | |
| 2006/0007222 A1 | 1/2006 | Uy | |
| 2006/0077252 A1 | 4/2006 | Bain et al. | |
| 2006/0152487 A1 | 7/2006 | Grunnet-Jepsen et al. | |
| 2006/0187306 A1* | 8/2006 | Matsui | 348/207.11 |
| 2007/0002130 A1 | 1/2007 | Hartkop | |
| 2007/0075965 A1 | 4/2007 | Huppi et al. | |
| 2007/0120879 A1 | 5/2007 | Kanade et al. | |
| 2007/0263824 A1 | 11/2007 | Bangalore et al. | |
| 2007/0273839 A1 | 11/2007 | Doi et al. | |
| 2008/0012936 A1 | 1/2008 | White | |
| 2008/0063389 A1* | 3/2008 | Fang et al. | 396/56 |
| 2008/0086696 A1 | 4/2008 | Sri Prakash et al. | |
| 2008/0170123 A1 | 7/2008 | Albertson et al. | |
| 2008/0211915 A1 | 9/2008 | McCubbrey | |
| 2009/0041298 A1 | 2/2009 | Sandler et al. | |
| 2009/0111518 A1 | 4/2009 | Agrawal et al. | |
| 2009/0119736 A1 | 5/2009 | Perlman et al. | |
| 2009/0122572 A1 | 5/2009 | Page et al. | |
| 2009/0141147 A1 | 6/2009 | Alberts et al. | |
| 2009/0153474 A1 | 6/2009 | Quennesson | |
| 2009/0202114 A1 | 8/2009 | Morin et al. | |
| 2009/0207233 A1* | 8/2009 | Mauchly et al. | 348/14.09 |
| 2009/0210804 A1 | 8/2009 | Kurata et al. | |
| 2009/0216501 A1 | 8/2009 | Yeow et al. | |
| 2009/0309956 A1 | 12/2009 | Hawkins et al. | |
| 2009/0315984 A1 | 12/2009 | Lin et al. | |
| 2010/0073454 A1 | 3/2010 | Lovhaugen et al. | |
| 2010/0073456 A1 | 3/2010 | Bolle | |
| 2010/0128892 A1 | 5/2010 | Chen et al. | |
| 2010/0188473 A1 | 7/2010 | King et al. | |
| 2010/0262718 A1 | 10/2010 | Ikeno et al. | |
| 2010/0285879 A1 | 11/2010 | Huang et al. | |
| 2010/0293468 A1 | 11/2010 | Thijssen | |
| 2010/0302343 A1 | 12/2010 | Bolle | |
| 2010/0309117 A1 | 12/2010 | Ohta | |
| 2010/0328423 A1 | 12/2010 | Etter | |
| 2011/0134205 A1 | 6/2011 | Arney et al. | |
| 2011/0149012 A1 | 6/2011 | Bolle et al. | |
| 2011/0170256 A1 | 7/2011 | Lee | |
| 2011/0181507 A1 | 7/2011 | Oakley | |
| 2011/0254914 A1 | 10/2011 | Ng | |
| 2011/0267421 A1 | 11/2011 | Sutter | |
| 2011/0268263 A1 | 11/2011 | Jones et al. | |
| 2012/0011454 A1 | 1/2012 | Droz et al. | |
| 2012/0036181 A1 | 2/2012 | Isidore | |
| 2012/0069218 A1 | 3/2012 | Gantman | |
| 2012/0081504 A1 | 4/2012 | Ng et al. | |
| 2012/0083314 A1 | 4/2012 | Ng et al. | |
| 2012/0098921 A1 | 4/2012 | Stedman et al. | |
| 2012/0154510 A1 | 6/2012 | Huitema et al. | |
| 2012/0204120 A1 | 8/2012 | Lefar et al. | |
| 2012/0216129 A1 | 8/2012 | Ng et al. | |
| 2013/0062866 A1* | 3/2013 | Breed | 280/731 |
| 2013/0141573 A1 | 6/2013 | Sutter et al. | |
| 2013/0314543 A1 | 11/2013 | Sutter et al. | |

FOREIGN PATENT DOCUMENTS

| | | |
|---|---|---|
| WO | 0182626 A1 | 11/2001 |
| WO | 0186953 A1 | 11/2001 |

OTHER PUBLICATIONS

Swivl Blog Post dated Dec. 28, 2010, www.swivl.com/2010/12/why-a-video-accessory/, 2 pages.

Swivl Blog Post dated Dec. 22, 2010, www.swivl.com/2010/12/live-on-indiegogo/, 2 pages.

Travis Deyle—IRobot AVA Telepresence Robot at CES 2011—5 pages—hizook.com, Jan. 6, 2011—www.hizook.com/blog/2011/01/06/irobot-ava-telepresence-robot-ces-2011-one-step-closer-robot-app-stores.

CISCO Webex, "What is Webex?" https://web.archive.org/web/20110101032216/http://www.webex.com/what-is-webex/index.html, downloaded Jan. 24, 2014, 2 pages.

"HP SkyRoom Version 1 (Quanity 500) Node-locked E-LTU Software (VK634AAE)—Specifications and Warranty," Hewlett Packard, http://h10010.www.1.hp.com/wwpc/us/en/sm/WF06b/18964-18964-4020068-4020071-4020069-4020938-4026194-4026196.html?dnr=2, downloaded Jan. 24, 2014, 3 pages.

Gross, M., et al., "blue-c: A Spatially Immersive Display and 3D Video Portal for Telepresence," http://blue.ethz.ch/ACM 0730-0301/03/0700-0819, 2003, pp. 829-827.

Iizadi, S., et al., "Going beyond the Display: A Surface Technology with an Electronically Switchable Diffuser," UIST '08, Oct. 19-22, 2008, Monterey, California, pp. 269-278.

Ishii, H. et al., "ClearBoard: A Seamless Medium for Shared Drawing and Conversation with Eye Contact," CHI '92, May 3-7, 1992, pp. 525-532.

Kuechler, M., et al., "HoloPort—A Device for Simultaneous Video and Data Conferencing Featuring Gaze Awareness," IEEE Virtual Reality Conference (VR'06) IEEE Computer Society, Mar. 25-29, 2006, pp. 81-88.

(56) References Cited

OTHER PUBLICATIONS

Lo, D., "Multimodal Talker Localization in Video Conferencing Environments," The 3rd IEEE International Workshop on Haptic, Audio and Visual Environments and their Applications, 2004 (HAVE '04), Oct. 2-3, 2004, pp. 195-200.

NEC Display Solutions, "CRV43 Curved Ultra-Wide Display," http://www.necdisplay.com/newtechnologies/curveddisplay/, Apr. 12, 2010, 2 pages.

Polycom, Polycom CX 5000 Video Collarboration Device-Products-Polycom, http://www.polycom.com/products/voice/conferencing_solutions/microsft_optimized_conferencing/cx5000.html, Apr. 12, 2010, 1 page.

Shiwa, S., et al., "A Large-Screen Visual Telecommunication Device Enabling Eye Contact," SID 91 Digest, 1991, pp. 327-328.

Tan, K., et al., "ConnectBoard: A Remote Collaboration System that Supports Gaze-Aware Interaction and Sharing," 2009 IEEE International Workshop on Multimedia Signal Processing, (MMSP '09) Oct. 5-7, 2009, 6 pages.

Lance Ulanoff—I'Robot's AVA is an App-Ready Robot—2 pages—pcmag.com, Jan. 6, 2011—www.pcmag.com/article2/0,2817,2375313,00.asp.

Foreign Communication From a Related Counterpart Application, PCT Application No. PCT/US2012/066511, International Search Report dated Jun. 13, 2013, 4 pages.

International Search Report and Written Opinion mailed on Dec. 3, 2014, in connection with related international patent application No. PCT/US2013/48070, 8 pgs.

Web Conferencing & Online Meetings Overview: WebEx; http://www.webex.com/what-is-webex/index.html, printed on Feb. 22, 2011.

\* cited by examiner

METHOD AND SYSTEM FOR CONTROLLING AN IMAGING SYSTEM

CROSS-REFERENCE TO RELATED APPLICATIONS

This application is related to U.S. patent application Ser. No. 12/770,991, filed Apr. 30, 2010, entitled "Method and Apparatus for Two-Way Multimedia Communications," which is incorporated by reference herein in its entirety.

FIELD OF THE INVENTION

This specification relates generally to two-way multimedia communications, and more particularly to methods and apparatus for enabling an individual to participate in a meeting from a remote location.

BACKGROUND

Modern telecommunications technologies enable people to conduct meetings without being physically present at the same location. It has become commonplace for individuals at different locations to use telephone conferencing and/or video communications technologies to conduct business meetings, conference calls, and other forms of interaction. However, existing communication systems used to conduct such meetings typically employ only a speakerphone and perhaps one or more computer-based audio/video platforms. Existing systems do not provide to those participating in such meetings a simulated experience of being in the presence of the other participants.

SUMMARY OF THE INVENTION

In accordance with an embodiment, a method for displaying image data is provided. First image data representing a first view, captured by a camera system, of a second location, is displayed at a first location. The first view is associated with a first orientation relative to the second location. A first angular displacement associated with a motion of a chair disposed at the first location is determined. Information representing the first angular displacement is transmitted to the camera system. Second image data representing a second view of the second location associated with a second orientation is displayed at the first location, the second orientation having a relationship to the first orientation based on the first angular displacement.

In one embodiment, motion data representing a motion of a chair is received from a sensor attached to the chair. In another embodiment, a motion of the chair is detected by the sensor mounted on the chair. The sensor may comprise one of a magnetometer and a compass sensor.

In another embodiment, information representing the first angular displacement is transmitted, by a device located at the first location, to the camera system. The device may be one of: a personal computer, a laptop computer, a cell phone, a wireless device, a personal digital assistant, and a television. The camera system may comprise a video camera.

In another embodiment, the device causes the video camera to turn from the first orientation to the second orientation, based on the determined first angular displacement. The step of displaying, at a first location, first image data representing a first view may further include generating, by a camera system disposed at the second location, first image data representing the first view of the second location, transmitting the first image data from the second location to the first location, and displaying the first image data on the device located at the first location.

These and other advantages of the present disclosure will be apparent to those of ordinary skill in the art by reference to the following Detailed Description and the accompanying drawings.

DETAILED DESCRIPTION

Figure 1:
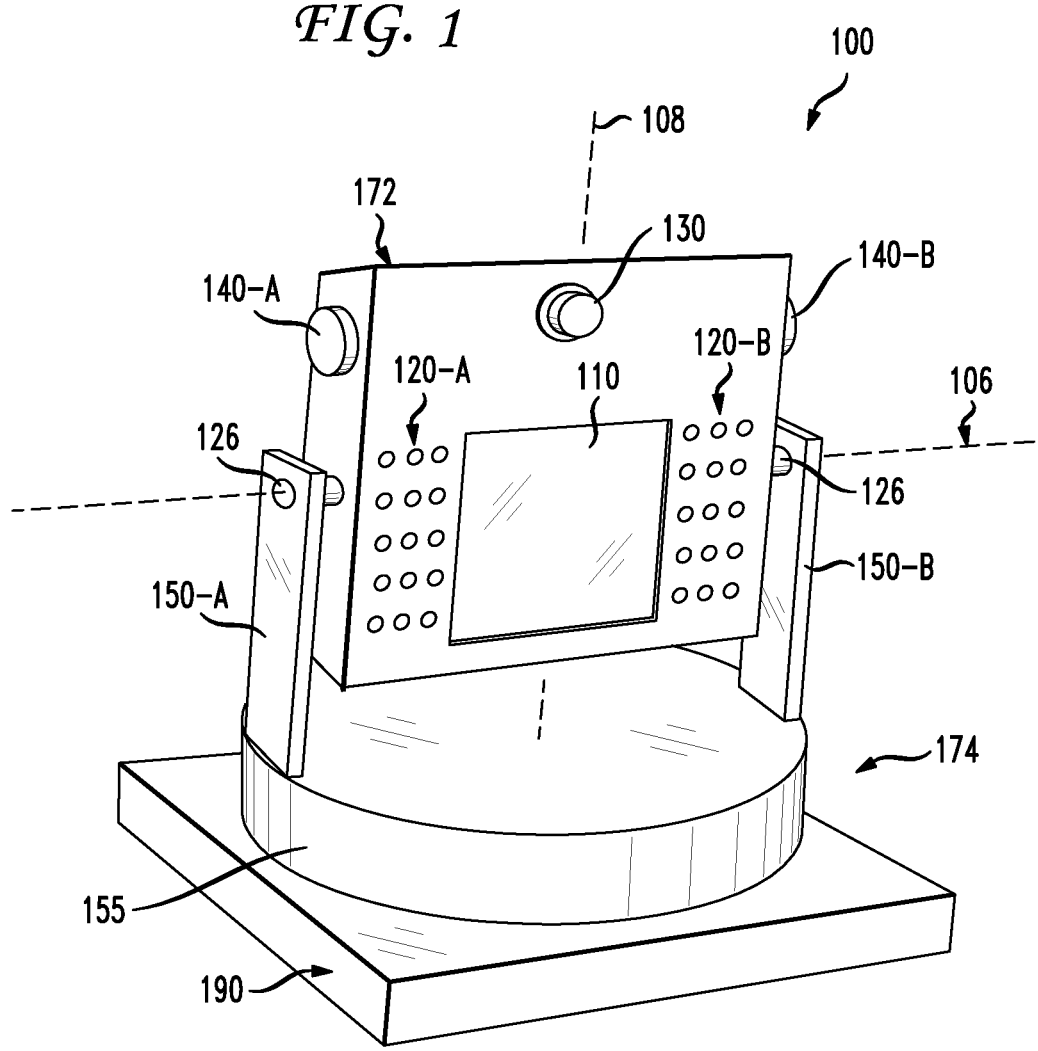
FIG. 1 is an illustration of a surrogate head device, in accordance with an embodiment.

In accordance with an embodiment, a communication device (referred to herein as a "surrogate head device") functions as a surrogate for an individual, enabling the individual to attend a meeting from a remote location. The surrogate head device is placed at a first location where a meeting is being conducted. The surrogate head device comprises a camera and microphones which capture images and sounds from the conference room; the images and sounds are transmitted to the remote location for viewing by the remote participant. The surrogate head device also comprises a display device which displays video images of the remote participant, and one or more speakers which convey voice signals received from the remote participant. Two-way communications are therefore conducted through the exchange of images and sounds between the first location and the remote participant.

The surrogate head device is supported by a support structure that allows the device to rotate to the right and to the left about a substantially vertical axis, enabling the viewing area of the camera to pan to the right or to the left, and to tilt up and down about a substantially horizontal axis, enabling the viewing area of the camera to pan up or down.

The remote participant utilizes a remote control device to control the surrogate head device. The remote control device may be linked to the surrogate head device via a network, such as the Internet. The remote control device includes a camera to capture video images of the remote participant, and one or more microphones to record his or her voice. The video images and voice signals are transmitted to the surrogate head device. The remote control device also comprises a display screen that enables the remote participant to view images of the meeting captured by the camera on the surrogate head device, and one or more audio speakers that enable the remote participant to hear voices and other sounds detected by the microphones on the surrogate head device. The audio speakers may be two speakers in a set of headphones worn by the remote participant, for example. The remote control device also includes one or more control devices, such as a computer mouse and/or a keypad, with which the remote participant controls the movement of the surrogate head device remotely. For example, the remote participant may cause the surrogate head device to rotate to the right or left, or to tilt up or down, by rolling a computer mouse to the right or to the left, or forward or backward. The remote participant's ability to rotate the surrogate head device to the right or left, or to tilt the device up and down, enables the remote participant to achieve and maintain eye contact with a person present at the meeting.

In one embodiment, the surrogate head device comprises two microphones situated in a manner to approximate the perception of sounds by a human. The sounds detected by the two microphones are mapped to two speakers used by the remote participant, generating for the remote participant a simulation of being present at the meeting. For example, when a person seated at the meeting to the right of the surrogate head device speaks, the sounds detected by the two microphones are mapped to the remote participant's two headphone speakers and cause the remote participant to perceive a voice coming from his or her right side.

The remote participant may control the movement of the surrogate head device based on the sounds generated by the two speakers in the headphones. For example, when the remote participant perceives a voice coming from his or her right side, the remote participant may cause the surrogate head device to rotate to the right in order to view the speaker at the meeting.

FIG. 1 is an illustration of a surrogate head device 100, in accordance with an embodiment of the invention. Surrogate head device 100 comprises a head portion 172 and a base portion 174. Head portion 172 comprises a display device 110, audio speakers 120-A and 120-B, a camera 130, and two microphones 140-A and 140-B. Surrogate head device 100 may comprise more or fewer than two microphones, any number of audio speakers, more than one camera, and more than one display device.

Base portion 174 supports head portion 172 and comprises a platform 190, a pan base 155, and a tilt base 150. In particular, head portion 172 is supported by tilt base 150, which comprises two vertical portions 150-A and 150-B disposed on pan base 155, and two horizontal support rods 126 attached to head portion 172. Support rods 126 define a horizontal axis 106 between vertical portions 150, and are configured to rotate about horizontal axis 106, causing head portion 172 to rotate about horizontal axis 106. Pan base 155 is disposed on platform 190 and is configured to rotate about a substantially vertical axis 108, causing head portion 172 to rotate about vertical axis 108. The capability of tilt base 150 and pan base 155 to rotate about two axes enables head portion 172 to rotate in order to face in a desired direction.

Display device 110 may comprise a liquid crystal display ("LCD"). In other embodiments, display device 110 may comprise another type of display device. Audio speakers 120-A and 120-B may comprise any type of audio device capable of reproducing voice signals and other sounds. Camera 130 may comprise any type of camera capable of capturing images and generating corresponding image data for transmission to a remote participant.

Microphones 140-A and 140-B may comprise any type of device capable of detecting sounds and generating corresponding audio signals for transmission to a remote participant. In one embodiment of the invention, two microphones 140-A and 140-B are situated on surrogate head device 100 at a distance that approximates the distance between the ears on a human's head, in order to receive audio signals in a manner substantially consistent with the reception of audio signals by a human's ears. Because microphones 140-A and 140-B are attached to head portion 172 of surrogate head device 100, the remote participant may maintain an accurate sense of audio direction because the microphones are always at the same position relative to camera 130. In other embodiments, surrogate head device 100 may be configured differently than as shown in FIG. 1. For example, surrogate head device 100 may comprise other components, and other mechanisms may be used to move all or portions of the device.

Figure 2:
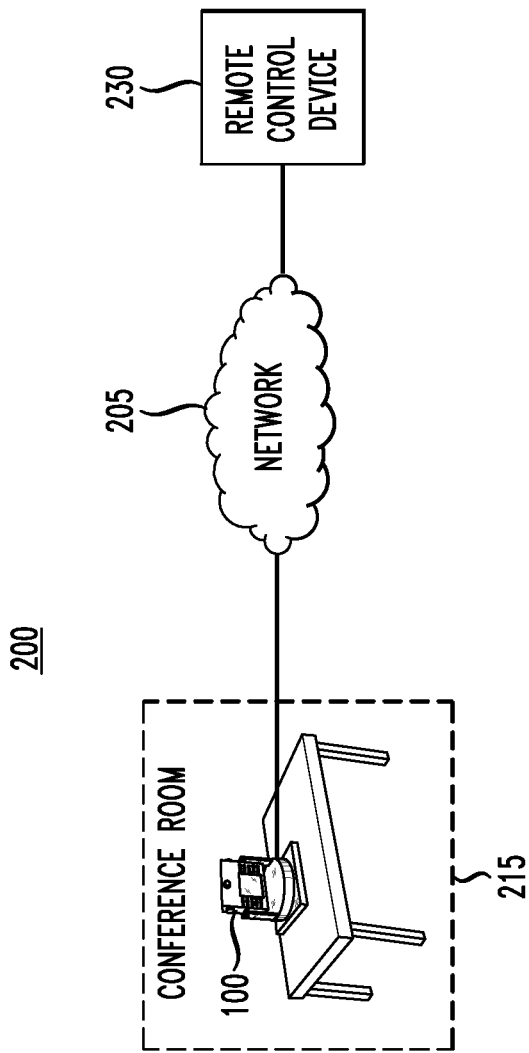
FIG. 2 shows an example of a communication system, in accordance with an embodiment.

FIG. 2 illustrates a communication system 200 that enables an individual to participate in a meeting from a remote location, in accordance with an embodiment of the invention. Communication system 200 comprises surrogate head device 100 located in a conference room 215, a network 205, and a remote control device 230. Surrogate head device 100 is placed at a selected location within conference room 215, for example on a table among individuals who are present at the conference. Surrogate head device 100 and remote control device 230 are linked via network 205.

Network 205 may comprise one or more of a number of different types of networks, such as, for example, an intranet, a local area network (LAN), a wide area network (WAN), an internet, Fibre Channel-based storage area network (SAN) or Ethernet. Other networks may be used. Alternatively, network 205 may comprise a combination of different types of networks. In some embodiments, surrogate head device 100 may be linked to remote control device 230 via a direct connection.

Remote control device 230 is operated by an individual at a location remote from conference room 215. Remote control device 230 conveys, to the remote participant, audio and video signals received from surrogate head device 100, and transmits audio and video signals to surrogate head device 100. Remote control device 230 also transmits to surrogate head device 100 control signals received from the remote participant. In this manner, the remote participant may employ remote control device 230 to control surrogate head device 100 remotely.

Figure 3:
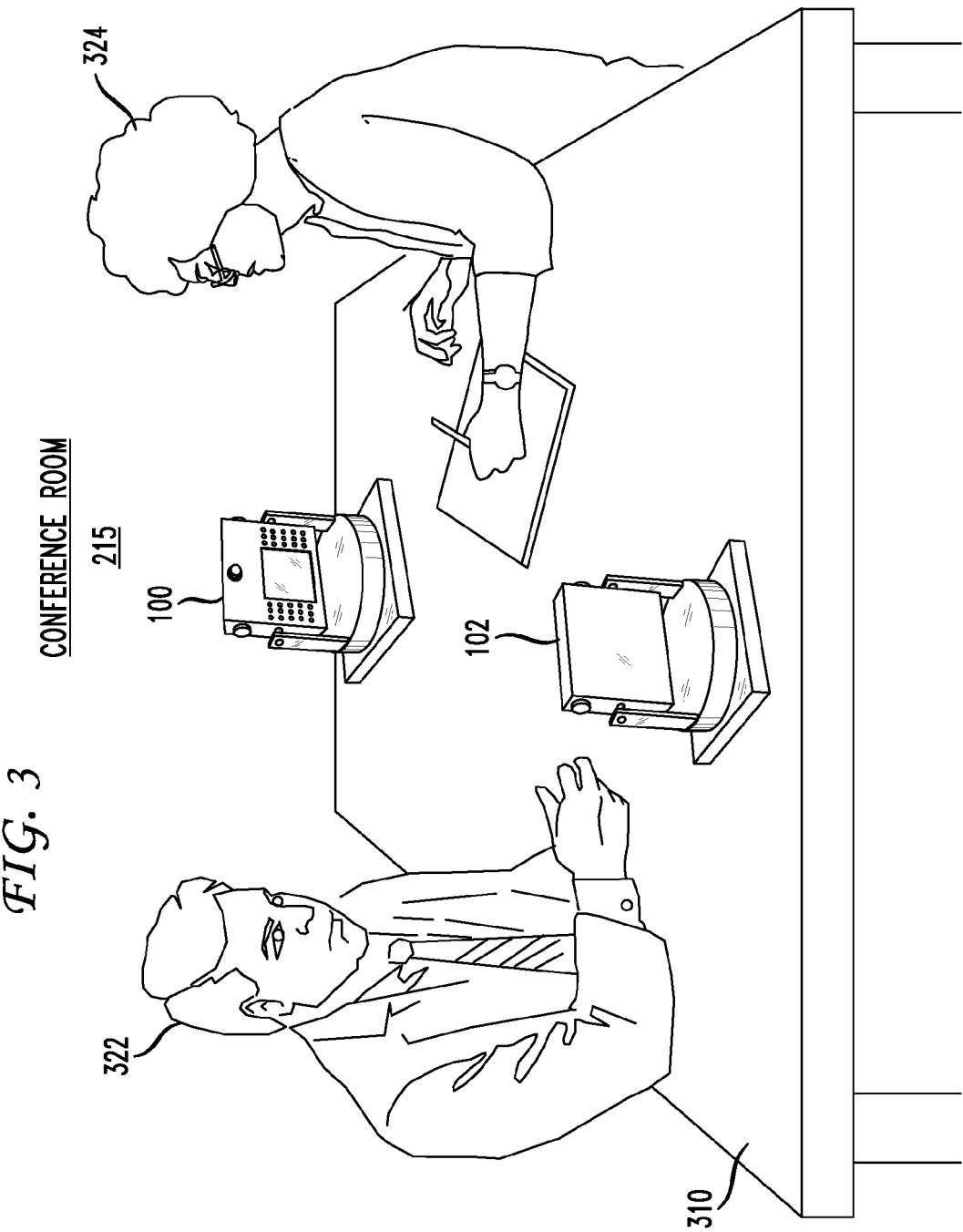
FIG. 3 shows a conference room, in accordance with an embodiment.

By selective placement within conference room 215, surrogate head device 100 may enable the remote participant to receive audio and video signals from conference room 215 in a manner that simulates the sensation of being physically present in conference room 215. FIG. 3 shows conference room 215, in accordance with an embodiment of the invention. In this example, a conference is being held around a table 310 located in conference room 215. Surrogate head device 100 is placed selectively on table 310. A second surrogate head device 102 is also placed selectively on table 310. Two individuals 322 and 324 are attending the conference in person, and two other individuals are participating remotely via surrogate head devices 100 and 102. By selective placement on table 310, surrogate head devices 100 and 102 enable their respective operators to control their devices to achieve and maintain eye-to-eye contact with persons 322 and 324, as desired. In addition, appropriate placement may also enable the operators of surrogate head devices 100 and 102 to maintain eye-to-eye contact with one another. Surrogate head devices 100 and 102 may also enable their respective operators to perceive audio signals, including voices, from the conference room, in a manner that simulates the sensation of being physically present in the conference room.

While the exemplary embodiment discussed herein describes a meeting held in a conference room, the systems, apparatus and methods described herein may be used to enable an individual to attend other types of meetings held in other places, from a remote location.

Figure 4:
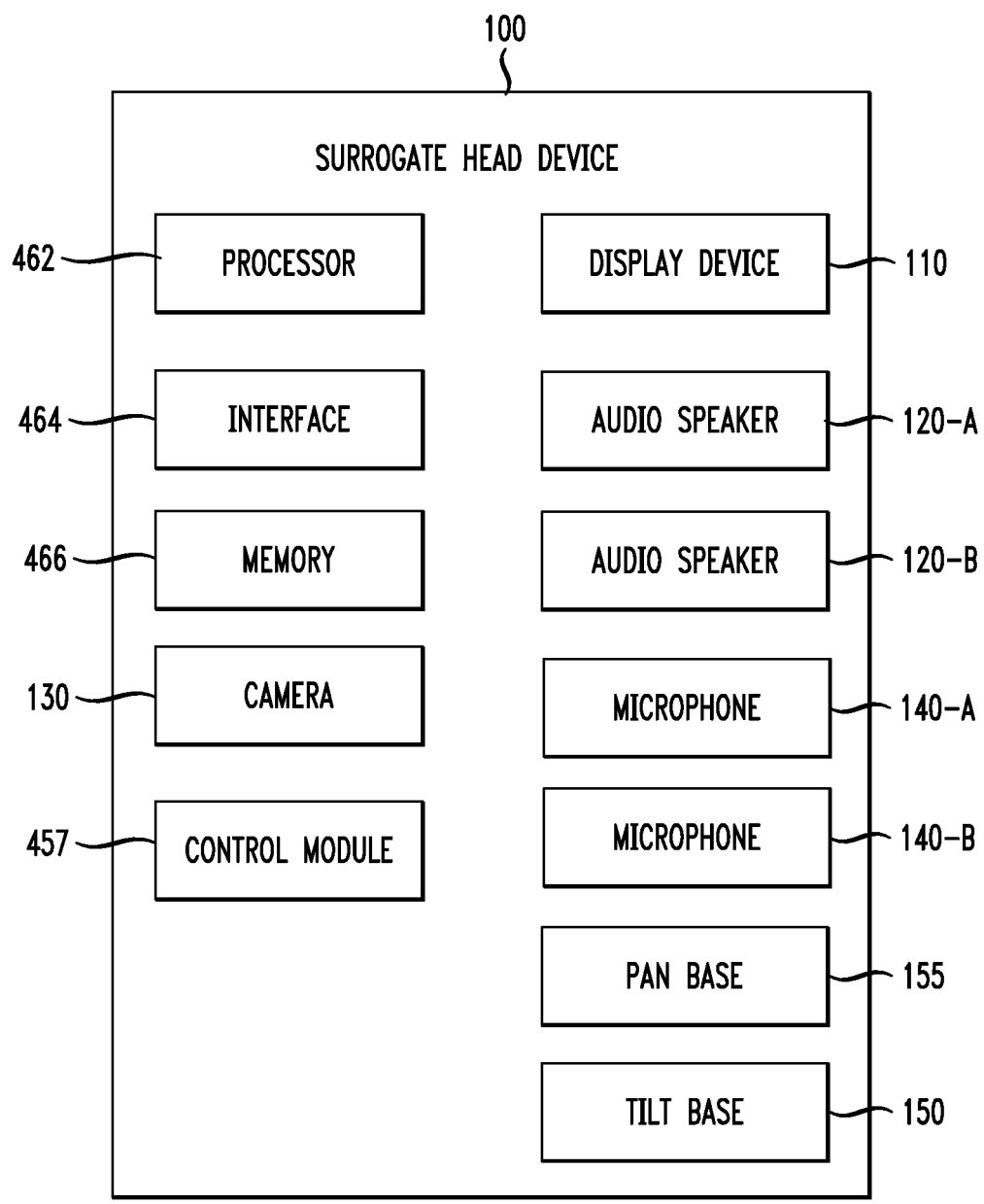
FIG. 4 is a block diagram of components of a surrogate head device, in accordance with the embodiment of FIG. 1.

FIG. 4 is a block diagram of components of surrogate head device 100, in accordance with the embodiment of FIG. 1. Some of the components shown in FIG. 4 correspond to components shown in FIG. 1. For example, surrogate head device 100 comprises display device 110, audio speakers 120-A and 120-B, microphones 140-A and 140-B, camera 130, pan base 155, and tilt base 150.

Surrogate head device 100 also comprises a processor 462, an interface 464, and a memory 466. Processor 462 controls various operations of surrogate head device 100 by executing computer program instructions which define such operations. The computer program instructions may be stored in a non-transitory computer readable medium such as a random access memory (RAM), one or more disk drives, one or more optical disks, one or more tape drives, etc. Processor 462 may comprise hardware, software, or a combination of hardware and software. For example, in one embodiment, processor 462 comprises operating system software controlled by hardware, such as a central processing unit (CPU).

Interface 464 provides a communication gateway through which data may be transmitted between components of surrogate head device 100 and network 205. For example, interface 464 transmits to remote control device 230, via network 205, audio signals received by microphones 140-A and 140-B and video signals received by camera 130. Interface 464 receives audio signals and video signals from remote control device 230, via network 205, and transmits the audio and video signals to speakers 120-A and 120-B, and to display device 110, respectively. Interface 464 also receives control signals received from remote control device 230, and transmits the control signals to control module 457. In various embodiments, interface 464 may be implemented using a number of different mechanisms, such as one or more enterprise systems connection cards, modems, or network interfaces. Other types of interfaces may be used.

Memory 466 is accessed by processor 462 and/or other components of surrogate head device 100 to store various types of information. Memory 466 may comprise any one or more of a variety of different types of non-transitory computer readable media, such as random access memory (RAM), one or more disk drives, one or more optical disks, one or more tape drives, etc. Other types of memory devices may be used.

In one embodiment, pan base 155 may comprise one or more electromechanical components such as servos, motors, control circuitry, gears, etc., configured to enable pan base 155 to move in response to control signals. Pan base 155 may also comprise one or more microprocessors and memory devices to facilitate its operation. In other embodiments, other mechanisms may be used to control the movements of pan base 155.

In one embodiment, tilt base 150 may comprise one or more electromechanical components such as servos, motors, control circuitry, gears, etc., configured to enable tilt base 150 to move in response to control signals. Tilt base 150 may also comprise one or more microprocessors and memory devices to facilitate its operation. In other embodiments, other mechanisms may be used to control the movements of tilt base 150.

Surrogate head device 100 also comprises a control module 457. Control module 457 receives control signals from remote control device 230 (shown in FIG. 2), and controls the movement of pan base 155 and tilt base 150 in response to the control signals. For example, control module 457 may generate electrical signals and transmit such signals to servos and/or other components within pan base 155 and tilt base 150 in response to control signals received from remote control device 230. Control module 457 may also control functions of camera 130, display device 110, audio speakers 120-A and 120-B, and microphones 140-A and 140-B based on control signals received from remote control device 230.

Control module 457 may comprise a software program that includes multiple modules or subroutines providing respective services or functions, for example. In other embodiments, control module 457 may comprise multiple software programs. In alternative embodiments, control module 457 may comprise hardware, or a combination of hardware and software. Control module 457 may comprise a non-transitory computer readable medium, such as a magnetic disk, magnetic tape, or optical disk, that includes instructions in the form of computer code operable to perform various functions. In some embodiments, some or all of control module 457 may comprise instructions in the form of computer code that are stored in memory 466.

In other embodiments, surrogate head device 100 may comprise other components (software or hardware) in addition to those discussed herein.

Figure 5:
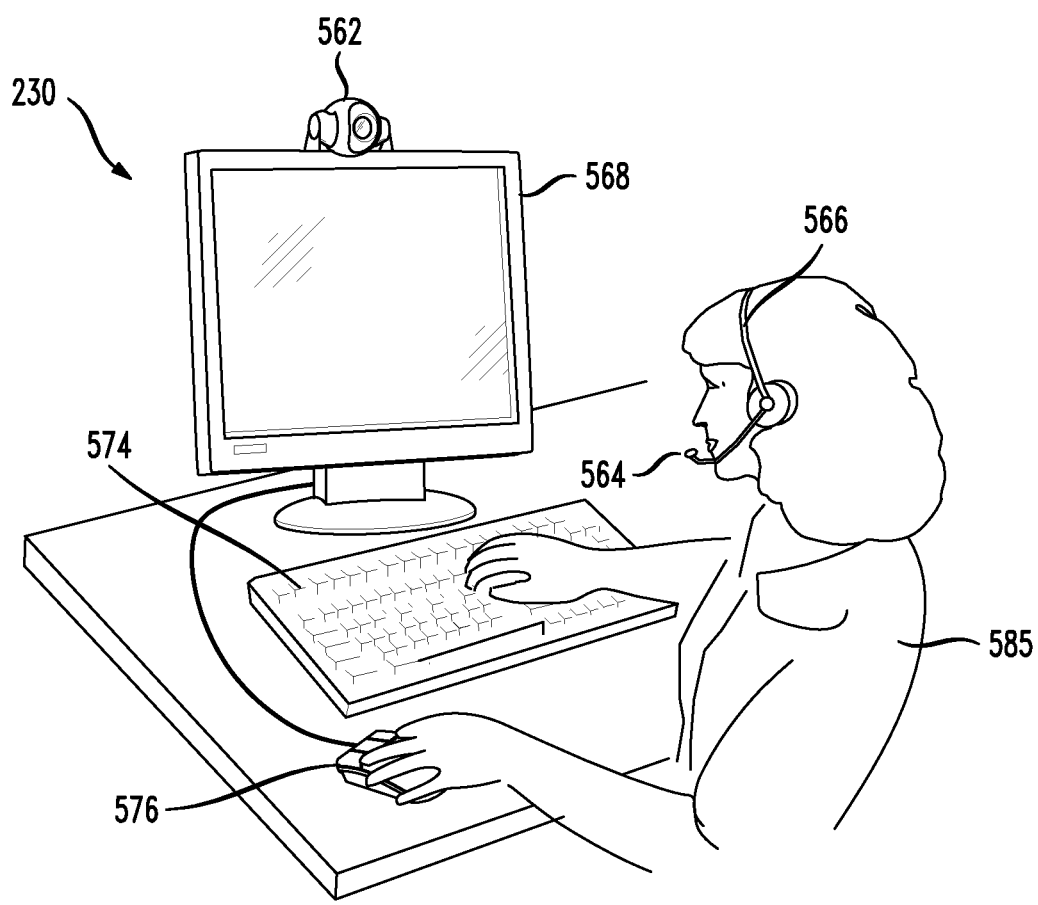
FIG. 5 shows a remote participant employing a remote control device, in accordance with an embodiment.

FIG. 5 shows a remote participant 585 employing a remote control device 230 to control a surrogate head device, in accordance with an embodiment of the invention. In this example, remote control device 230 comprises a personal computer. Remote control device 230 comprises a display screen 568, a camera 562, a keyboard 574, and a mouse device 576. Remote control device 230 also comprises speakers 566 and microphone 564. In this example, speakers 566 include two speakers in a set of headphones worn by remote participant 585. Alternatively, remote control device 230 may comprise another type of device capable of two-way communication with a surrogate head device, such as a laptop computer, a handheld computer, a cell phone, a laptop, a Blackberry, etc.

Referring again to FIG. 2, remote control device 230 is linked to surrogate head device 100 via network 205, enabling remote participant 585 to control surrogate head device 100 remotely. Remote participant 585 may use mouse device 576 and/or keyboard 574 to generate control signals for controlling the movement of surrogate head device 100. Mouse device 576 may be a computer mouse with two buttons and a scroll wheel, for example. Keyboard 574 may be a QWERTY keyboard. Other types of mouse devices and keyboards may be used, or other types of devices capable of generating control signals, such as a joystick, a touchpad, etc.

Display device 568 may comprise a liquid crystal display ("LCD"). In other embodiments, display device 568 may comprise another type of display device. Audio speakers 566 may comprise any type of audio device capable of reproducing voice signals and other audio signals that may be received from surrogate head device 100. Camera 562 may comprise any type of camera capable of capturing images and generating corresponding video data for transmission to surrogate head device 100. Microphone 564 may comprise any type of device capable of detecting sounds and generating corresponding audio data for transmission to surrogate head device 100.

Figure 6:
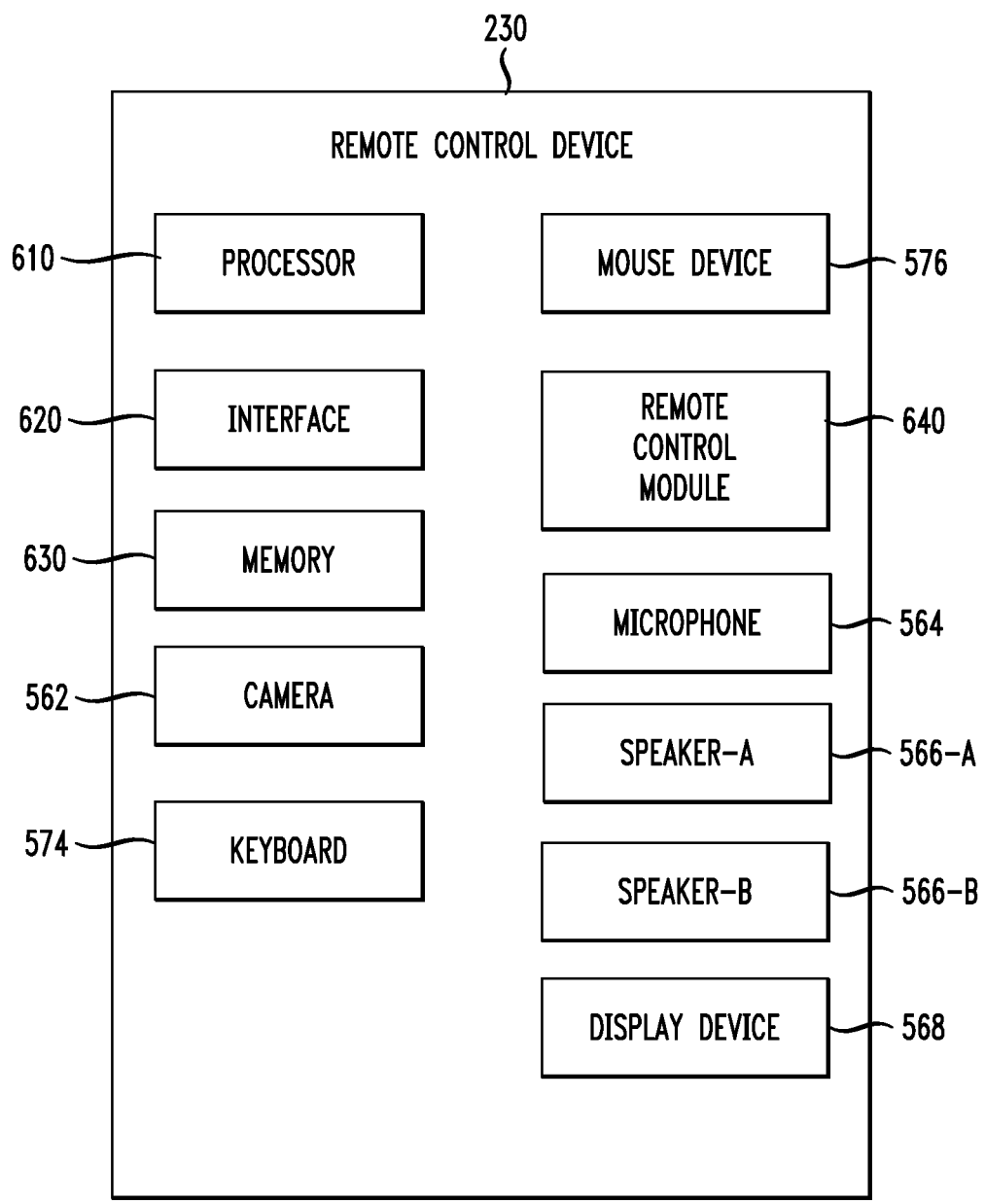
FIG. 6 is a block diagram of components of a remote control device, in accordance with an embodiment.

FIG. 6 is a block diagram of components of remote control device 230, in accordance with an embodiment of the invention. Some of the components of remote control device 230 shown in FIG. 6 correspond to components shown in FIG. 5. For example, remote control device 230 comprises display device 568, microphone 564, camera 562, mouse device 576, and keyboard 574. In this embodiment, speakers 566 comprise two speakers, including a right speaker 566-A and a left speaker 566-B, in a set of headphones.

Remote control device 230 also comprises a processor 610, an interface 620, and a memory 630. Processor 610 controls various operations of remote control device 230 by executing computer program instructions which define such operations. The computer program instructions may be stored in a non-transitory computer readable medium such as a random access memory (RAM), one or more disk drives, one or more optical disks, one or more tape drives, etc. Processor 610 may comprise hardware, software, or a combination of hardware and software. For example, in one embodiment, processor 610 comprises operating system software controlled by hardware, such as a central processing unit (CPU).

Interface 620 provides a communication gateway through which data may be transmitted between components of remote control device 230 and network 205. Interface 620 transmits to surrogate head device 100, via network 205, audio signals received by microphone 564 and video signals received by camera 562. Interface 620 receives audio signals and video signals from surrogate head device 100, via network 205, and transmits such signals to speakers 566 and to display device 568, respectively. Interface 620 receives control signals from remote control module 640 and transmits the control signals to surrogate head device 100. In some embodiments, interface 620 may receive control signals directly from mouse device 576 and from keyboard 574, and transmit the control signals to surrogate head device 100. In various embodiments, interface 620 may be implemented using a number of different mechanisms, such as one or more enterprise systems connection cards, modems, or network interfaces. Other types of interfaces may be used.

Memory 630 is accessed by processor 610 and/or other components of remote control device 230 to store various types of information. Memory 630 may comprise any one or more of a variety of different types of non-transitory computer readable media, such as random access memory (RAM), one or more disk drives, one or more optical disks, one or more tape drives, etc. Other types of memory devices may be used.

Remote control device 230 also comprises a remote control module 640. Remote control module 640 receives signals from mouse device 576 and from keyboard 574, and converts such signals into corresponding control signals for controlling surrogate head device 100. For example, movements of mouse device 576, or selections of keys on keyboard 574, may be detected and converted into appropriate control signals for controlling the movement of surrogate head device 100. Remote control module 640 transmits such control signals to surrogate head device 100 via interface 620. In another embodiment, a speech recognition system may be used to detect voice commands spoken by the remote participant, and generate corresponding control signals. In other embodiments, a gesture control system, and/or a facial recognition system may be used to detect facial movements and/or gestures made by the remote participant, and generate corresponding control signals.

Remote control module 640 may comprise a software program that includes multiple modules or subroutines providing respective services or functions, for example. In other embodiments, remote control module 640 may comprise multiple software programs. In alternative embodiments, remote control module 640 may comprise hardware, or a combination of hardware and software. Remote control module 640 may comprise a non-transitory computer readable medium, such as a magnetic disk, magnetic tape, or optical disk, that includes instructions in the form of computer code operable to perform various functions. In some embodiments, some or all of remote control module 640 may comprise instructions in the form of computer code that are stored in memory 630.

In other embodiments, remote control device 230 may comprise other components (software or hardware) in addition to those discussed herein.

In one embodiment, sounds detected by microphones 140-A and 140-B on surrogate head device 100 are selectively mapped to speakers 566-A and 566-B of remote control device 230, generating for remote participant 585 a simulation of being present in conference room 215. For example, when an individual seated in conference room 215 to the right of surrogate head device 100 speaks, the sounds detected by microphone 140-A are mapped to the remote participant's headphone speaker 566-A, and the sounds detected by microphone 140-B are mapped to the remote participant's headphone speaker 566-B, causing the remote participant to perceive a voice coming from his or her right side. In the exemplary embodiment, control module 457 (shown in FIG. 4) of surrogate head device 100 may perform processing to map the respective audio signals detected by microphones 140-A and 140-B to two "stereo" transmission channels associated with speakers 566-A and 566-B, respectively, prior to transmitting the signals to remote control device 230. For example, a first transmission channel A corresponding to "right" and a second transmission channel B corresponding to "left" may be used. The audio signals are received at remote control device 230 via the two transmission channels, and transmitted respectively to the corresponding speakers 566-A and 566-B. In other embodiments, the respective audio signals detected by microphones 140-A and 140-B may be mapped respectively to speakers 566-A and 566-B using other techniques, such as by using other types of channels, by coding, etc. In another embodiment, signals detected by microphones 140-A and 140-B are transmitted by surrogate head device 100 directly to remote control device 230, and remote control module 640 maps the audio signals to speakers 566-A and 556-B.

In some embodiments, including the embodiment described above, a remote participant operating remote control device 230 controls surrogate head device 100 to achieve and maintain eye contact with an individual in conference room 215. For example, appropriate rotation of surrogate head device 100 by a remote participant toward an individual who is speaking in conference room 215 may enable the remote operator and the speaker to see each other's faces and expressions in real-time, enabling eye-to eye contact to be achieved and maintained.

Figure 7:
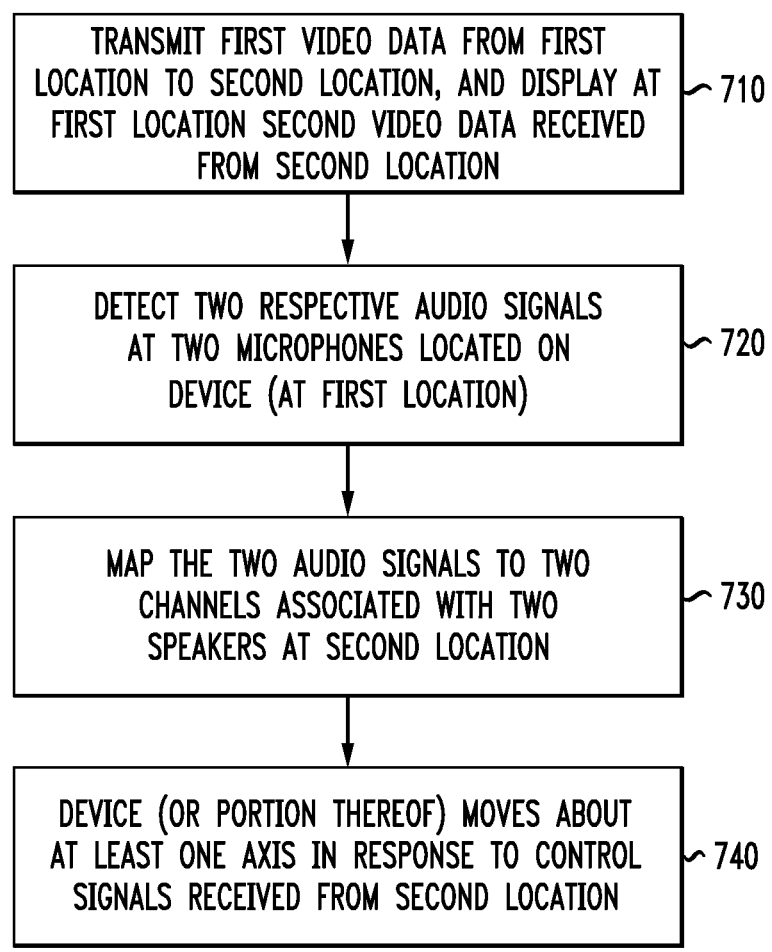
FIG. 7 is a flowchart depicting a method for conducting two-way multimedia communications, in accordance with an embodiment.

FIG. 7 is a flowchart depicting a method for conducting two-way audio and video communications, in accordance with an embodiment of the invention. At step 710, first video data is transmitted from a first location to a second location, and second video data received from the second location is displayed at the first location. In the exemplary embodiment, surrogate head device 100 transmits video data from conference room 215 to remote control device 230, and displays video data received from remote control device 230 to participants in conference room 215.

At step 720, two respective audio signals are detected at two microphones located on the device at the first location. As discussed above, surrogate head device 100 detects two audio signals at microphones 140-A and 140-B. The audio signals may contain voice signals, for example. At step 730, the two audio signals are mapped respectively to two channels associated with two speakers used by an operator at the second location. In the exemplary embodiment, surrogate head device 100 maps the two audio signals to two transmission channels (channels A and B, discussed above) and transmits the signals to remote control device 230. The two transmission channels are associated with two speakers in the remote operator's headphones 566.

At step 740, at least a portion of the device moves about at least one axis in response to control signals received from the operator at the second location. As discussed above, surrogate head device 100 receives control signals from remote control device 230, and in response, head portion 172 is rotated around a vertical axis by pan base 155 and/or about a horizontal axis by tilt base 150.

In some embodiments, the method steps described in FIG. 7 are defined by computer program instructions that are stored in memory 466 of surrogate head device 100 and executed by processor 462. In one example, control module 457 comprises computer program instructions implemented as computer executable code appropriately programmed by one skilled in the art to perform the algorithm defined by the method steps described in FIG. 7. By executing the computer program instructions, processor 462 executes the algorithm defined by the method steps of FIG. 7.

In another embodiment, a user at a first location employs a remote control device and a motion sensor to control a camera system located at a second location. The remote control device receives data representing a motion, and generates control signals based on the motion data. For example, a sensor attached to the user's chair or body may detect when the user turns to the left, and generate corresponding motion signals. The remote control device detects the control signals and transmits corresponding control signals to the remotely located camera system, causing the camera system (or a component of the camera system) to pan to the left. In this manner, the user may control the orientation of the camera system and obtain different views of the camera's surroundings. For example, the camera system may comprise surrogate head device 100. Alternatively, the camera system may comprise one or more surveillance cameras, for example.

Figure 8:
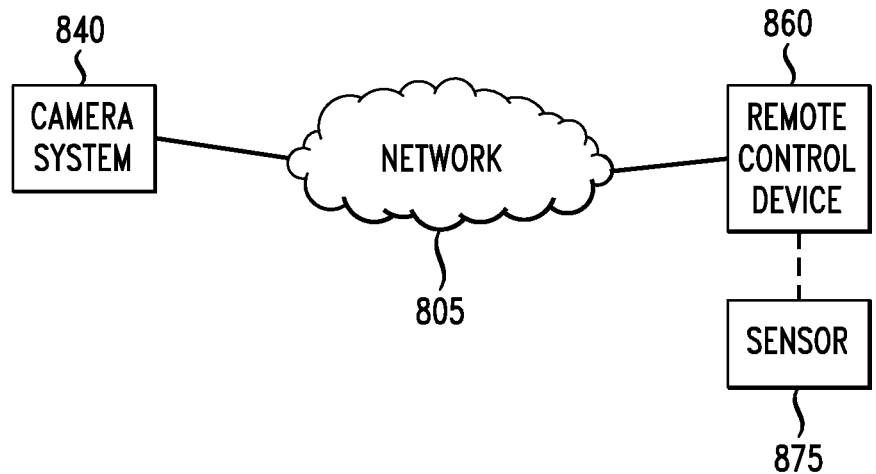
FIG. 8 shows an example of a communication system, in accordance with an embodiment.

FIG. 8 shows a communication system 800 that may be used to conduct two-way communications in accordance with an embodiment. Communication system 800 includes a network 805, a camera system 840, a remote control device 860, and a sensor 875.

In the exemplary embodiment of FIG. 8, network 805 is the Internet. In other embodiments, network 805 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 805 may include a combination of different types of networks.

Camera system 840 may comprise any type of imaging system capable of capturing image data from different orientations. For example, camera system 840 may comprise a surrogate head device such as surrogate head device 100 shown in FIG. 1. In another embodiment, camera system 840 may comprise a pan/tilt/zoom (PTZ) camera that is fixed at a selected location (e.g., attached to a wall in a parking garage) and is capable of rotating to capture images at different angles, generating various views of the parking garage. In another example, camera system 840 may comprise a plurality of cameras (located on a street corner, for example), each fixed in a selected orientation and capable of generating a particular view of the vicinity associated with its respective orientation.

Sensor 875 comprises a motion sensor capable of generating data representing a motion experienced by the sensor. Sensor 875 transmits to remote control device 860 data representing the detected motion. In the illustrative embodiment, sensor 875 communicates with remote control device 860 wirelessly. In other embodiments, sensor 875 may communicate with remote control device 860 via a direct link, via a network, or in another manner.

Figure 9:
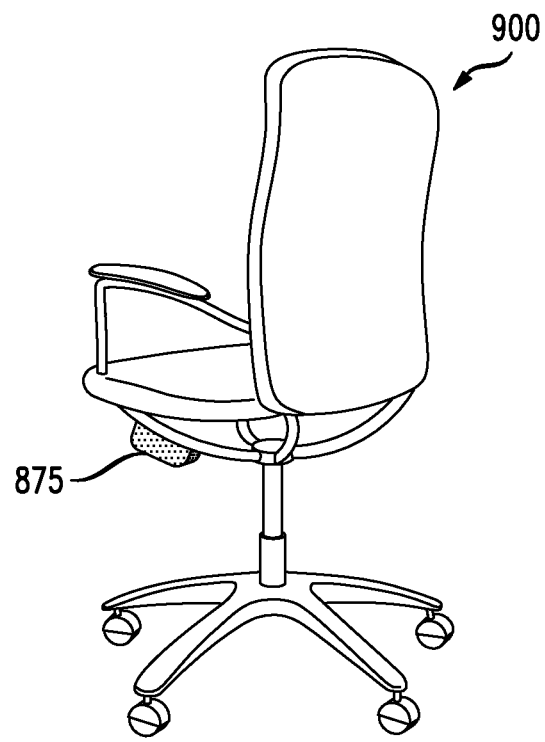
FIG. 9 shows a chair and an attached sensor, in accordance with an embodiment.

In one embodiment, sensor 875 is attached to a rotatable chair. FIG. 9 shows sensor 875 attached to a chair 900 in accordance with an embodiment. Chair 900 is capable of rotating, e.g. by swiveling. In the illustrative embodiment, chair 900 may swivel up to 360 degrees. Rotating, or swiveling, chairs are well known. Sensor 875 may be any type of motion sensor such as a magnetometer or a compass sensor. Sensor 875 may detect an angular speed and an angular acceleration of chair 900, for example. Sensor 875 transmits motion data representing the detected motion to remote control device 860. Sensor 875 may transmit motion data wirelessly, for example.

In one embodiment, sensor 875 is a compass sensor having a 0.5 degree heading resolution and 1 degree repeatability. Sensor 875 may be battery-powered and communicate wirelessly. For example, sensor 875 may be interfaced to a microcontroller board and use a wireless network standard such as Zigbee to communicate with remote control device 860. Alternatively, sensor 875 may be powered by a USB connection from remote control device 860, and use the USB connection (and/or Wi-Fi) for wireless networking.

In one embodiment, sensor 875 is battery-powered using a Li-polymer rechargeable battery. Sensor 875 comprises a microcontroller board and communicates wirelessly with remote control device 860.

Figure 10A:
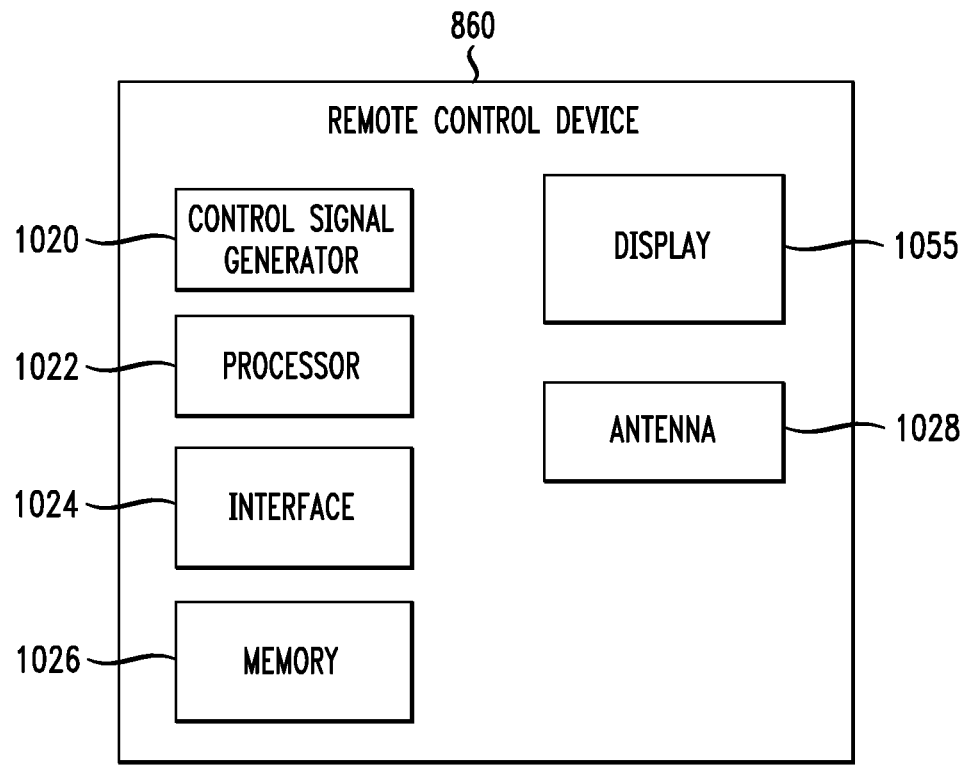
FIG. 10A shows components of a remote control device, in accordance with another embodiment.

FIG. 10A shows components of remote control device 860 in accordance with an embodiment. Remote control device 860 comprises a control signal generator 1020, a display 1055, a processor 1022, an interface 1024, a memory 1026, and an antenna 1028. Remote control device 860 may receive data wirelessly via antenna 1028, for example. Data, including motion data received from sensor 875, may be stored in memory 1026. Processor 1022 may comprise a CPU, for example. Interface 1024 may comprise a keyboard, a mouse, etc. Interface 1024 may also include one or more network interfaces for communicating via network 805. Remote control device 860 may comprise other components not shown in FIG. 10. For example, remote control device 860 may include one or more of the components of remote control device 230 as shown in FIG. 6. In one embodiment, remote control device 860 is a laptop computer, and display 1055 is a screen of the laptop computer. When remote control device 860 receives motion data from sensor 875 (via antenna 1028, for example), control signal generator 1020 converts the motion data to information representing an angular displacement. For example, control signal generator 1020 may generate angular displacement information indicating that chair 90° rotated X degrees from a first orientation to a second orientation, where X is any value between −180 and +180. Remote control device 860 transmits the angular displacement information to camera system 840, via network 805.

Figure 10B:
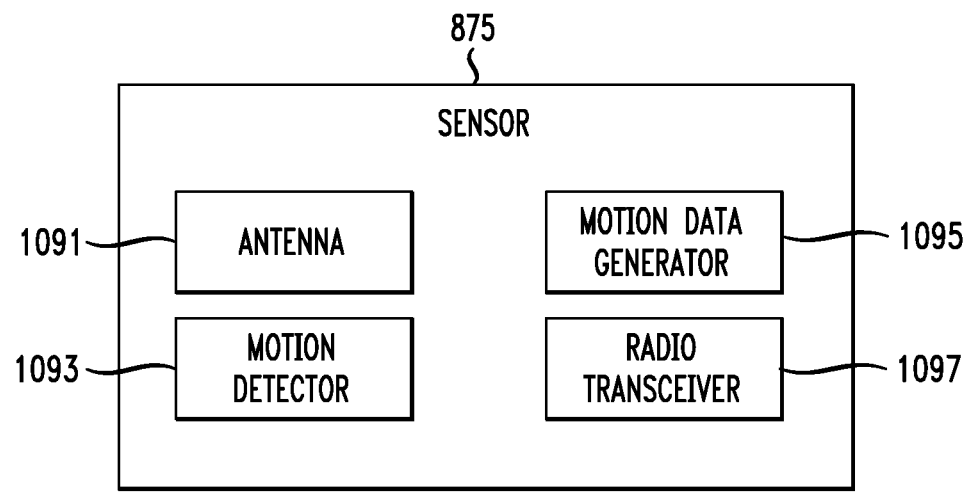
FIG. 10B shows components of a sensor in accordance with an embodiment.

FIG. 10B shows components of sensor 875 in accordance with an embodiment. Sensor 875 comprises an antenna 1091, a motion detector 1093, a motion data generator 1095, and a radio transceiver 1097. Sensor 875 may comprise other components not shown in FIG. 10B. In some embodiments, antenna 1091 may be omitted. In the illustrative embodiment of FIG. 10B, motion detector 1093, which may comprise a gyroscope, for example, detects a motion of sensor 875. Motion data generator 1095, which may be a microcontroller, for example, generates motion data representing the motion, and transmits the motion data via radio transceiver 1097. In other embodiments, sensor 875 may have another configuration.

Figure 11:
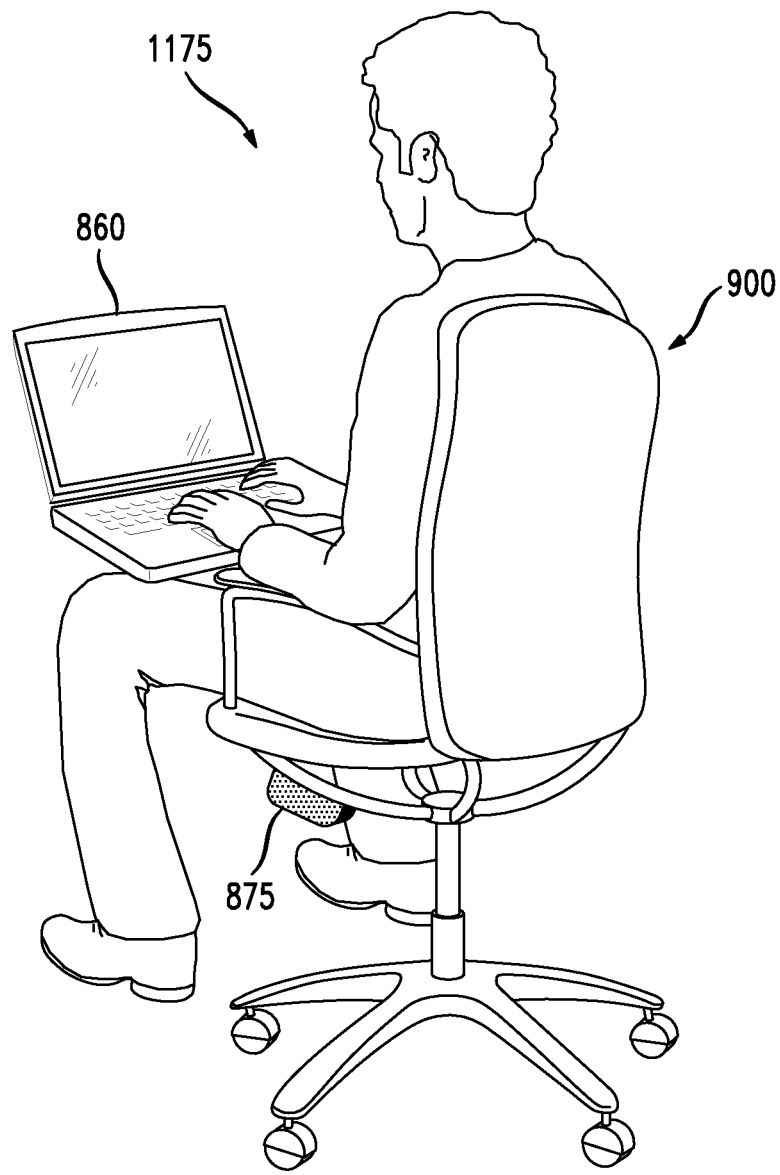
FIG. 11 shows a user using the chair and sensor of FIG. 9 and the remote control device of FIG. 10, in accordance with an embodiment.

In accordance with an embodiment, a user may employ sensor 875 and remote control device 860 to control camera system 840. FIG. 11 shows a user 1175 employing chair 900 (with sensor 875 attached), and remote control device 860, in accordance with an embodiment. User 1175 may control camera system 840 by swiveling around in chair 900, causing chair 900 to rotate through a desired angular displacement. Sensor 875 detects the motion of chair 900 and transmits motion data to remote control device 860. Remote control device 860 receives the motion data, determines an angular displacement based on the motion data, and transmits the angular displacement information to camera system 840, via network 805.

In one embodiment, camera system 840 comprises surrogate head device 100 (shown in FIG. 1) disposed in a conference room located remote from remote control device 860. A user sitting in chair 900 (with attached sensor 875) uses sensor 875 and remote control device 860 to control surrogate head device 100. For example, user 1175 of FIG. 11 may sit in chair 900, to which sensor 875 is attached, and hold remote control device 860 in his lap (as illustrated in FIG. 11). As the user swivels in chair 900, sensor 875 generates motion data and transmits the motion data to remote control device 860. Remote control device 860 receives the motion data and, in response, transmits corresponding control signals (including angular displacement information) to surrogate head device 100 via network 805. Surrogate head device 100 receives the control signals from remote control device 860, and in response, causes head portion 172 to rotate around a vertical axis by pan base 155. In one embodiment, surrogate head device 100 may receive control signals indicating an angular displacement of chair 900 and, in response, cause head portion 172 to rotate a around a vertical axis by a number of degrees substantially equal to the angular displacement of chair 900. In a specific example, when the user swivels 60 degrees to the left (counter-clockwise) in chair 900, remote control device 860 transmits control signals representing a 60 degree turn to the left (counter-clockwise), and surrogate head device 100 causes head portion 172 to rotate 60 degrees in a counter-clockwise direction around a vertical axis.

In another embodiment, surrogate head device 100 may receive control signals indicating an angular displacement of chair 900 and, in response, cause head portion 172 to rotate a around a vertical axis by a number of degrees that is different from, but determined based on, the angular displacement of chair 900. Surrogate head device 100 may store and consult a mapping that maps various angular displacement inputs to respective angular displacement output values. For example, an angular displacement input of 50 degrees (representing the angular displacement of chair 900) may be mapped to an angular displacement value of 40 degrees. In such case, when the user swivels 50 degrees in chair 900, surrogate head device 100 causes head portion 172 to turn 40 degrees. In another example, surrogate head device 100 may be configured to rotate about a vertical axis in response to an angular displacement of chair 900, but only up to a predetermined limit, for example, a thirty degree displacement to the left and to the right of a selected orientation; any displacement of chair 900 beyond thirty degrees from a corresponding orientation would cause no additional rotation of surrogate head device 100. Other configurations are possible.

Suppose, then, that user 1175 wishes to participate remotely in a conference being held in conference room 215 (shown in FIG. 3). User 1175 employs remote control device 860 to control surrogate head device 100, enabling him to view participant 324 (sitting at table 310). In the illustrative embodiment, remote control device 860 is a laptop computer; user 1175 holds the laptop on his lap while sitting in chair 900, as shown in FIG. 11.

Figure 12:
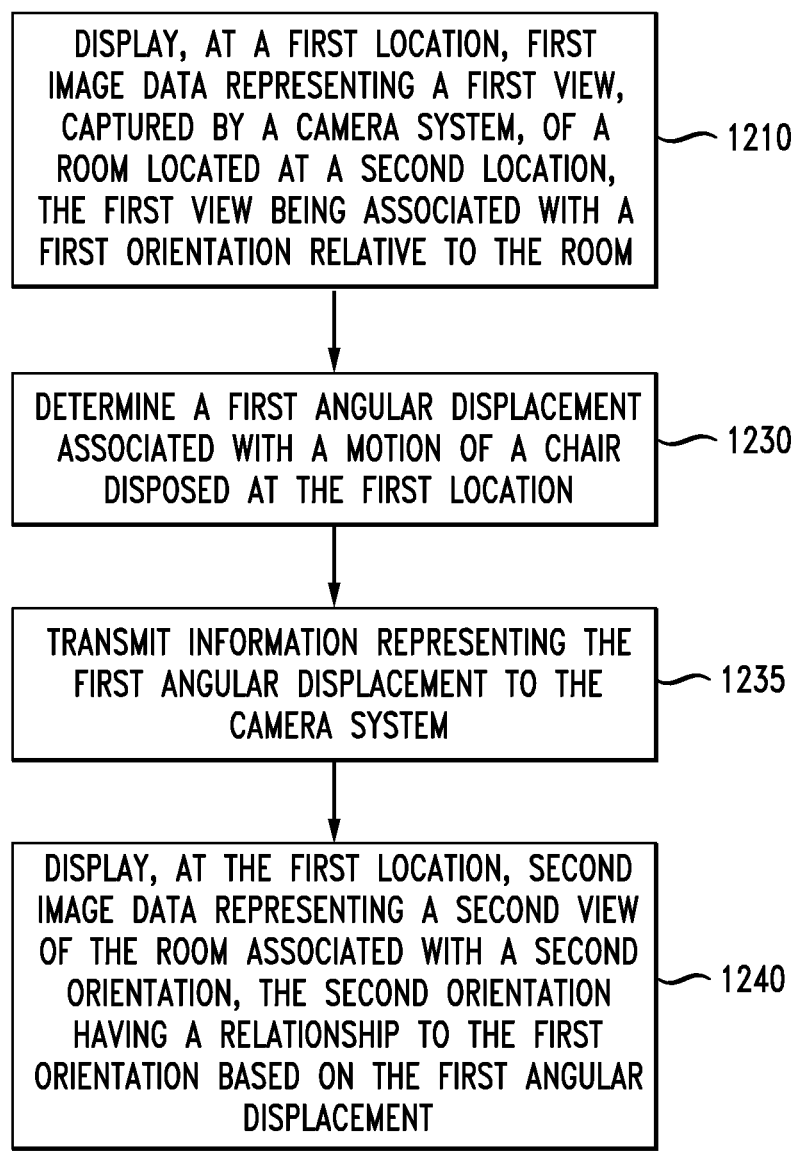
FIG. 12 is a flowchart depicting a method of controlling an imaging system in accordance with an embodiment.

FIG. 12 is a flowchart depicting a method of controlling a camera system in accordance with an embodiment. At step 1210, first image data representing a first view, captured by a camera system, of a room located at a second location, is displayed at a first location, the first view being associated with a first orientation relative to the room. In the illustrative embodiment, surrogate head device 100 captures image data showing participant 324 and transmits the image data to remote control device 860. Remote control device 860 receives and displays the image data, enabling user 1175 to see a first view of conference room 215 which includes participant 324. The first view, including an image of participant 324, corresponds to a first orientation within conference room 215 defined by the respective locations of surrogate head device 100 and participant 324.

A motion of a chair disposed at the first location is detected. Supposing that user 1175 wishes to view participant 322, user 1175 swivels in chair 900 approximately 90 degrees to the right. Sensor 875 detects the rotational motion of chair 900 and transmits (via antenna 1091, for example) to remote control device 860 motion data representing the chair's motion. Remote control device 860 receives the motion data (via antenna 1028, for example).

At step 1230, a first angular displacement associated with the motion of a chair disposed at the first location is determined. Remote control device 860 determines, based on the motion data, that chair 900 has experienced (approximately) a 90 degree rotation to the right (clockwise).

At step 1235, information representing the first angular displacement is transmitted to the camera system. Remote control device 860 transmits to surrogate head device 100 angular displacement information defining the first angular displacement. Surrogate head device 100 receives the angular displacement information, and in response, causes head portion 172 to rotate clockwise around a vertical axis by 90 degrees, or by approximately 90 degrees. Surrogate head device 100 now captures second image data of a second view of conference room 215, including a view of participant 322. Surrogate head device 100 transmits the second image data to remote control device 860. The second view corresponds to a second orientation within conference room 215 that is displaced from the first orientation by approximately 90 degrees.

At step 1240, second image data representing a second view of the room associated with a second orientation, the second orientation having a relationship to the first orientation based on the first angular displacement, is displayed at the first location. Remote control device 860 displays the second image data, enabling user 1175 to see the second view, including participant 322. As discussed above, the second view corresponds to the second orientation within conference room 215; the angular displacement between the second orientation and the first orientation is approximately 90 degrees.

In another embodiment, sensor 875 detects that chair 900 tilts forward (rather than rotates), for example, when the user leans forward, causing the chair's seat to tilt forward. Sensor 875 transmits to remote control device 860 motion data representing the chair's tilting motion. The motion data may comprise an angular displacement, for example. Remote control device 860 transmits to surrogate head device 100 angular displacement information defining the chair's tilting motion. Surrogate head device 100 receives the angular displacement information, and in response, causes head portion 172 to rotate a around a horizontal axis by a corresponding angular displacement. Surrogate head device 100 now captures image data of a different view of conference room 215, such as a view of a document placed on the table, or a view of the floor. Surrogate head device 100 transmits image data to remote control device 860. Remote control device 860 displays the image data to the user (allowing the user to view a document on the table, for example).

In another embodiment, sensor 875 detects that chair 900 tilts back (rather than rotates), for example, when the user leans back, causing the chair's seat to tilt backward. Sensor 875 transmits to remote control device 860 motion data representing the chair's tilting motion. The motion data may comprise an angular displacement about a horizontal axis, for example. Remote control device 860 transmits to surrogate head device 100 displacement information defining the chair's tilting motion. Surrogate head device 100 receives the displacement information, and in response, causes head portion 172 to rotate a around a horizontal axis by a corresponding angular displacement. Surrogate head device 100 now captures image data of a different view of conference room 215, such as a view of a person standing in the conference room, or a view of the ceiling of the conference room. Surrogate head device 100 transmits image data to remote control device 860. Remote control device 860 displays the image data to the user (allowing the user to view a person standing in the conference room, for example).

In another embodiment, sensor 875 detects that chair 900 tilts forward (rather than rotates), for example, when the user leans forward, causing the chair's seat to tilt forward. Sensor 875 transmits to remote control device 860 motion data representing the chair's tilting motion. The motion data may comprise an angular displacement, for example. Remote control device 860 transmits to surrogate head device 100 angular displacement information defining the chair's tilting motion. Surrogate head device 100 receives the displacement information, and in response, causes camera 130 (on head portion 172) to zoom by an amount determined based on the angular displacement information. Surrogate head device 100 captures "zoomed" image data of conference room 215. Surrogate head device 100 transmits "zoomed" image data to remote control device 860. Remote control device 860 displays the "zoomed" image data to the user.

In another embodiment, sensor 875 is attached to the user's body or clothing, (instead of being attached to chair 900). For example, sensor 875 may be attached to a tag attached to the user's pocket, to a wristband, etc. In another embodiment, sensor 875 may be attached to or disposed within remote control device 860. When the user swivels in the chair, leans forward, leans back, etc., sensor 875 detects the motion and transmits motion data to control signal generator 1020 (within remote control device 860). Remote control device 860 controls surrogate head device 100 based on the motion data, in the manner described above.

In one embodiment, sensor 875 is attached to chair 900 and is employed in the manner described above to control rotational movements of a remote camera system such as surrogate head device 100. A second motion sensor is attached to the user's body and is used by the user to control a zoom function of the remote camera system. When the user moves forward, the second sensor detects the user's movement, and transmits to remote control device 860 motion data representing the user's motion. The motion data may comprise an angular displacement, for example. Remote control device 860 transmits to surrogate head device 100 angular displacement information defining how far the user has leaned forward. Surrogate head device 100 receives the angular displacement information, and in response, causes camera 130 (on head portion 172) to zoom by an amount determined based on the angular displacement information. Surrogate head device 100 captures "zoomed" image data of conference room 215. Surrogate head device 100 transmits "zoomed" image data to remote control device 860. Remote control device 860 displays the "zoomed" image data to the user.

In another embodiment, the zoom function may be controlled based on a distance between the user's head and remote control device 860. For example, remote control device 860 may determine when the user leans his or her head toward the screen of remote control device 860 and cause the camera to zoom in response to the movement of the user's head. For example, distance measurements (between remote control device 860 and the user's head) may be determined based on images captured by a camera on remote control device 860. Remote control device 860 may analyze such images using image processing techniques and/or face detection techniques. Alternatively, distance measurements (between remote control device 860 and the user's head) may be determined based on data obtained by a custom sensor disposed within remote control device 860, such as an ultrasonic ranging sensor.

Figure 13:
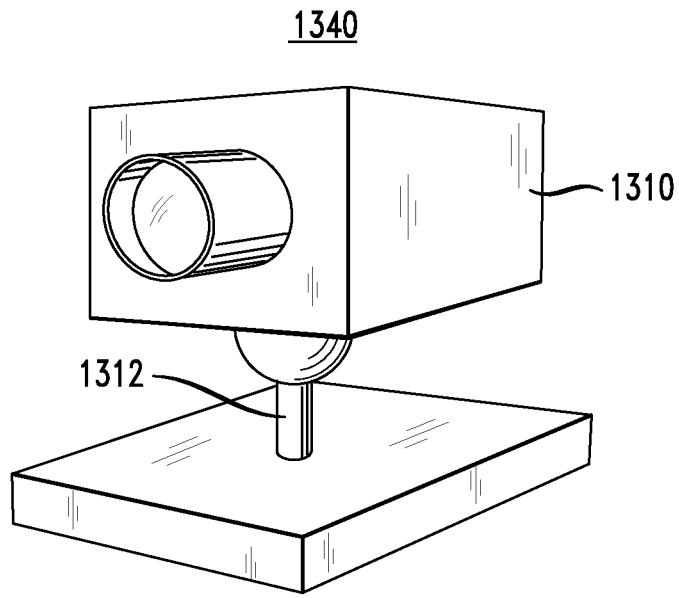
FIG. 13 shows a camera system in accordance with an embodiment.

In other embodiments, a camera system comprises one or more video cameras (e.g., surveillance cameras) disposed in a selected location. FIG. 13 shows an example of a camera system 1340 that may be connected to network 805 and controlled by remote control device 860 in accordance with an embodiment. In the illustrative embodiment, camera system 1340 comprises a camera device 1310 disposed on a rotating support mechanism 1312. Support mechanism 1312 may rotate, allowing camera device 1310 to capture various views of the vicinity. In some embodiments, camera system 1340 may rotate up to 360 degrees; in other embodiments, camera system 1340 may rotate only through a limited angular range, for example, up to 180 degrees. Camera system 1340 may comprise a processor (not shown) capable of receiving control signals and, in response to the control signals, controlling various components of camera system 1340.

In one embodiment, a user sitting in chair 900 (with attached sensor 875) uses sensor 875 and remote control device 860 to control camera system 1340. For example, user 1175 of FIG. 11 may sit in chair 900, to which sensor 875 is attached, and hold remote control device 860 in his lap. As the user swivels in chair 900, sensor 875 generates motion data and transmits the motion data to remote control device 860. Remote control device 860 receives the motion data and, in response, transmits corresponding control signals (including angular displacement information) to camera system 1340 via network 805. Camera system 1340 receives the control signals from remote control device 860, and in response, causes support mechanism 1312 to rotate around a vertical axis, causing camera device 1310 to rotate from a first orientation to a second orientation. In a specific example, when the user swivels 60 degrees to the left (counter-clockwise) in chair 900, remote control device 860 transmits control signals representing a 60 degree turn to the left (counter-clockwise)

to camera system 1340, and camera system 1340 causes camera device 1310 to rotate 60 degrees in a counter-clockwise direction around a vertical axis. Camera device 1310 captures a view from the new (second) orientation, and transmits image data to remote control device 860. Remote control device 860 displays the image data to the user.

In another embodiment, remote control device 860 controls camera device 1310 directly. For example, remote control device 860 may transmit instructions directly to camera device 1310, causing camera device 1310 to turn a specified number of degrees in a specified direction.

In various embodiments, the method steps described herein, including the method steps described in FIG. 7 and/or 12, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 7 and/or 12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 14:
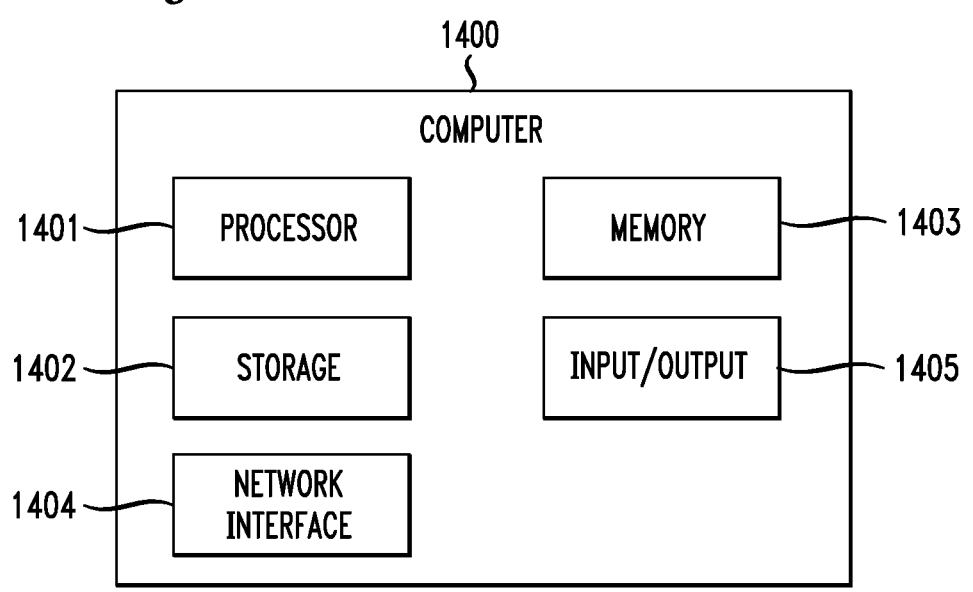
FIG. 14 shows a computer that may be used to implement certain embodiments of the invention.

A high-level block diagram of an exemplary computer that may be used to implement systems, apparatus and methods described herein is illustrated in FIG. 14. Computer 1400 includes a processor 1401 operatively coupled to a data storage device 1402 and a memory 1403. Processor 1401 controls the overall operation of computer 1400 by executing computer program instructions that define such operations. The computer program instructions may be stored in data storage device 1402, or other computer readable medium, and loaded into memory 1403 when execution of the computer program instructions is desired. Thus, the method steps of FIG. 7 and/or 12 can be defined by the computer program instructions stored in memory 1403 and/or data storage device 1402 and controlled by the processor 1401 executing the computer program instructions. For example, the computer program instructions can be implemented as computer executable code programmed by one skilled in the art to perform an algorithm defined by the method steps of FIG. 7 and/or 12. Accordingly, by executing the computer program instructions, the processor 1401 executes an algorithm defined by the method steps of FIG. 7 and/or 12. Computer 1400 also includes one or more network interfaces 1404 for communicating with other devices via a network. Computer 1400 also includes one or more input/output devices 1405 that enable user interaction with computer 1400 (e.g., display, keyboard, mouse, speakers, buttons, etc.).

Processor 1401 may include both general and special purpose microprocessors, and may be the sole processor or one of multiple processors of computer 1400. Processor 1401 may include one or more central processing units (CPUs), for example. Processor 1401, data storage device 1402, and/or memory 1403 may include, be supplemented by, or incorporated in, one or more application-specific integrated circuits (ASICs) and/or one or more field programmable gate arrays (FPGAs).

Data storage device 1402 and memory 1403 each include a tangible non-transitory computer readable storage medium. Data storage device 1402, and memory 1403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1405 may include peripherals, such as a printer, scanner, display screen, etc. For example, input/output devices 1405 may include a display device such as a cathode ray tube (CRT) or liquid crystal display (LCD) monitor for displaying information to the user, a keyboard, and a pointing device such as a mouse or a trackball by which the user can provide input to computer 1400.

Any or all of the systems and apparatus discussed herein, including remote control device 230, remote control device 860, camera system 840, and components thereof, may be implemented using a computer such as computer 1400.

One skilled in the art will recognize that an implementation of an actual computer or computer system may have other structures and may contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for displaying image data, the method comprising:
    displaying, at a first location, first image data representing a first view, captured by a camera system, of a second location, the first view being associated with a first orientation relative to the second location;
    determining a first angular displacement associated with a motion of a chair disposed at the first location;

transmitting information representing the first angular displacement to the camera system disposed at a video conference room; and displaying, at the first location, second image data representing a second view of the second location associated with a second orientation, the second orientation having a relationship to the first orientation based on the first angular displacement.

2. The method of claim 1, further comprising:
receiving motion data representing a motion of a chair.

3. The method of claim 2, further comprising:
transmitting information representing the first angular displacement, by a device located at the first location, to the camera system.

4. The method of claim 3, wherein the device comprises one of:
a personal computer, a laptop computer, a cell phone, a wireless device, a personal digital assistant, and a television.

5. The method of claim 4, further comprising:
detecting, by a sensor mounted on the chair, a motion of the chair.

6. The method of claim 5, further comprising:
causing the video camera to turn from the first orientation to the second orientation, based on the determined first angular displacement.

7. The method of claim 1, wherein displaying, at a first location, first image data representing a first view further comprises:
generating, by a camera system disposed at the second location, first image data representing the first view of the second location;
transmitting the first image data from the second location to the first location; and
displaying the first image data on the device located at the first location.

8. The method of claim 1, further comprising:
detecting a second motion at the first location; and
causing the camera system to zoom based on the detected second motion.

9. A non-transitory computer readable medium having program instructions stored thereon, that, in response to execution by a computing device, cause the computing device to perform operations comprising:
displaying, at a first location, first image data representing a first view, captured by a camera system, of a second location, the first view being associated with a first orientation relative to the second location;
determining a first angular displacement associated with a motion of a chair disposed at the first location;
transmitting information representing the first angular displacement to the camera system disposed at a video conference room; and
displaying, at the first location, second image data representing a second view of the second location associated with a second orientation, the second orientation having a relationship to the first orientation based on the first angular displacement.

10. The non-transitory computer readable medium of claim 9, further comprising program instructions defining the step of:
receiving the first image data from the camera system via a network.

11. The non-transitory computer readable medium of claim 10, further comprising program instructions defining the step of:
receiving motion data representing a motion of a chair.

12. The non-transitory computer readable medium of claim 11, wherein the non-transitory computer readable medium resides in a device located at the first location.

13. The non-transitory computer readable medium of claim 12, wherein the device comprises one of: a personal computer, a laptop computer, a cell phone, a wireless device, a personal digital assistant, and a television.

14. A system for displaying image data, the system comprising:
a sensor configured to:
detect a motion of a chair; and
transmit motion data representing the motion; and a device configured to:
display, at a first location, first image data representing a first view, captured by a camera system, of a second location, the first view being associated with a first orientation relative to the second location;
determine a first angular displacement associated with the motion of the chair, based on motion data received from the sensor;
transmit information representing the first angular displacement to the camera system disposed at a video conference room; and
display second image data representing a second view of the second location associated with a second orientation, the second orientation having a relationship to the first orientation based on the first angular displacement.

15. The system of claim 14, wherein the device is further configured to:
transmit data representing the first angular displacement to the camera system.

16. The system of claim 15, wherein the device comprises one of: a personal computer, a laptop computer, a cell phone, a wireless device, a personal digital assistant, and a television.

17. The system of claim 16, wherein the sensor is mounted on the chair.

18. The system of claim 17, wherein the sensor comprises one of a magnetometer and a compass sensor.

19. The system of claim 18, further comprising:
a camera system disposed at the second location, configured to:
generate the first image data representing the first view of the second location; and
transmit the first image data from the second location to the first location.

20. The system of claim 19, wherein the camera system comprises a video camera.

21. The system of claim 20, wherein the device is further configured to:
cause the video camera to turn from the first orientation to the second orientation, based on the determined first angular displacement.

* * * * *